(12) United States Patent
Keith (10) Patent No.: US 11,910,864 B2
(45) Date of Patent: Feb. 27, 2024

(54) LED INFORMATION CUEING APPARATUS FOR SPACESUIT HELMET

(71) Applicant: Rockwell Collins, Inc., Cedar Rapids, IA (US)

(72) Inventor: Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 386 days.

(21) Appl. No.: 17/230,130

(22) Filed: Apr. 14, 2021

(65) Prior Publication Data

US 2021/0337913 A1     Nov. 4, 2021

Related U.S. Application Data

(60) Provisional application No. 63/018,819, filed on May 1, 2020.

(51) Int. Cl.
     *A42B 3/30*      (2006.01)
     *G02B 27/01*      (2006.01)
     (Continued)

(52) U.S. Cl.
     CPC ............. *A42B 3/30* (2013.01); *A42B 3/0453* (2013.01); *A42B 3/20* (2013.01); *B64G 6/00* (2013.01);
     (Continued)

(58) Field of Classification Search
     CPC ..... A42B 3/042; A42B 3/0433; A42B 3/0453; A42B 3/228; A42B 3/22; A42B 3/225;
     (Continued)

(56) References Cited

U.S. PATENT DOCUMENTS 5,121,744 A * 6/1992 Njemanze ................ G09B 9/10
     600/20
5,162,828 A * 11/1992 Furness ................... G01S 13/60
     351/158

(Continued)

FOREIGN PATENT DOCUMENTS

| CA | 1075342 A | 4/1980 |
| GB | 2252048 B | 10/1992 |
| WO | WO-2020033733 A1 * | 2/2020 |

OTHER PUBLICATIONS

NASA Technical Memorandum 4064 NASA Informational Sciences and Human Factors Program: Annual Report, 1987, 238 pages.

*Primary Examiner* — Alissa L Hoey
*Assistant Examiner* — Patrick J. Lynch
(74) *Attorney, Agent, or Firm* — Suiter Swantz pc llo (57) ABSTRACT

A helmet assembly for a spacesuit or other protective suit is disclosed. In embodiments, the helmet assembly includes an external face shield attachable to the spacesuit and providing the spacesuit user with a forward field of view. The helmet assembly includes suit status displays hard-mounted to the external face shield at a periphery or edge of the forward field of view (e.g., upper, lower, left, right). Each suit status display includes a linear or one-dimensional array of individual light emitting diodes (LED) in communication with a suit controller of the spacesuit. Each LED array receives from the suit controller suit status data (e.g., consumables levels, suit performance, position data) communicated to the user by illuminating one or more of the individual LED units.

20 Claims, 5 Drawing Sheets

(51) Int. Cl.
  *B64G 6/00* (2006.01)
  *A42B 3/04* (2006.01)
  *A42B 3/20* (2006.01)
  *A62B 18/08* (2006.01)
  *A62B 18/04* (2006.01)

(52) U.S. Cl.
  CPC .......... *G02B 27/0172* (2013.01); *A62B 18/04* (2013.01); *A62B 18/08* (2013.01); *G02B 2027/0141* (2013.01)

(58) Field of Classification Search
  CPC ..... A42B 3/046; A62B 18/082; A62B 17/006; B64G 6/00; B64D 10/00; G02B 37/017; G02B 37/0172; G02B 2027/0141; B63C 2011/121; B63C 2011/188; A61F 9/06
  See application file for complete search history.

(56) References Cited

U.S. PATENT DOCUMENTS

| | | | |
|---|---|---|---|
| 5,191,317 A * | 3/1993 | Toth | G08B 21/182 340/815.45 |
| 6,075,445 A * | 6/2000 | McLoughlin | A42B 3/046 340/584 |
| 6,360,182 B1 * | 3/2002 | Hales | A62B 18/08 128/201.27 |
| 7,038,639 B1 * | 5/2006 | Olstad | G02B 27/0176 345/8 |
| 11,046,452 B1 * | 6/2021 | Viswanatha | G02B 27/01 |
| 2004/0223876 A1 * | 11/2004 | Kirollos | G01N 33/0063 422/68.1 |
| 2007/0028370 A1 * | 2/2007 | Seng | A41D 13/1281 2/410 |
| 2009/0059501 A1 * | 3/2009 | Yamaguchi | G02B 27/0176 361/679.3 |
| 2014/0345608 A1 * | 11/2014 | Zulonas | B63C 11/22 128/202.22 |
| 2015/0284061 A1 * | 10/2015 | Anderson | B63C 11/14 405/186 |
| 2016/0107258 A1 | 4/2016 | Denis | |
| 2017/0004895 A1 * | 1/2017 | Holman | A42B 3/30 340/584 |
| 2017/0124836 A1 * | 5/2017 | Chung | G08B 21/0415 |
| 2020/0015536 A1 | 1/2020 | Ciccaglione et al. | |

* cited by examiner

LED INFORMATION CUEING APPARATUS FOR SPACESUIT HELMET

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/018,819 entitled LED INFORMATION CUEING APPARATUS FOR SPACESUIT HELMET, filed May 1, 2020; Said U.S. Provisional Patent Application 63/018,819 is herein incorporated by reference in its entirety.

TECHNICAL FIELD

The subject matter disclosed by the instant application is directed generally to spacesuits and other protective equipment and more particularly to visual alert systems for the users and wearers of said protective equipment.

BACKGROUND

Conventional spacesuits incorporate a single-line liquid crystal display (LCD) mounted to the astronaut's chest and/or a paper notebook carried on the forearm with reference information. The LCD display requires effort and time to focus on, not being directly within the astronaut's default field of view, and requires the astronaut to manually scroll through a variety of data sources.

SUMMARY

In an aspect, a helmet assembly for a spacesuit with information cueing via light-emitting diode (LED) arrays is disclosed. In embodiments, the helmet assembly includes an external face shield (e.g., as a component of, or attachable to, a helmet) attachable to a spacesuit, the external face shield fully or partially see-through to provide a field of view for the user or wearer. The helmet assembly includes one or more status displays mounted to the external face shield peripheral to the user's field of view (e.g., top, bottom, left side, right side). Each status display includes a linear array of LED units extending vertically or laterally across the face shield. Each array of LED units conveys information (e.g., position, consumable level, pressure status) in a non-alphanumeric format perceptible by the user by adjusting the illumination of one or more LED units within the array (e.g., individually or in groups) by brightening, dimming, flashing, ramping, strobing, or color-changing one or more units.

In some embodiments, the array of LED units is situated within the forward field of view.

In some embodiments, the array of LED units is situated within the peripheral field of view.

In some embodiments, the array of LED units includes an array of individually addressable LED units.

In some embodiments, the LED controller indicates a suit status via dimming, flashing, or strobing one or more LED units of the array.

In some embodiments, the LED controller indicates a suit status via adjusting the brightness of one or more LED units.

In some embodiments, the LED controller indicates a suit status via changing the color of one or more LED units.

In some embodiments, the suit status includes a power level, a consumable level, a pressure status, and/or a component performance status of the suit.

In some embodiments, the suit status includes a relative position/bearing/heading of a vehicle, and/or a relative position/bearing/heading of another (e.g., proximate) spacesuit.

In some embodiments, the external face shield includes partially or fully transparent inner and outer layers separated by a gap layer, the suit status displays mounted to the inner layer within the gap layer.

In some embodiments, the LED controller receives instructions from the suit wearer and, based on the instructions, transitions from displaying a first suit status (via the LED units) to displaying a second suit status.

In some embodiments, the helmet assembly includes a microphone for receiving instructions spoken by the wearer.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a cueing and information system for spacesuits and other like protective equipment (e.g., firefighting suits, hazardous materials (hazmat) suits, underwater suits, other equipment for use in hazardous environments) incorporating arrays of light-emitting diodes (LED) as a simplified heads-up display (HUD).

Figure 1:
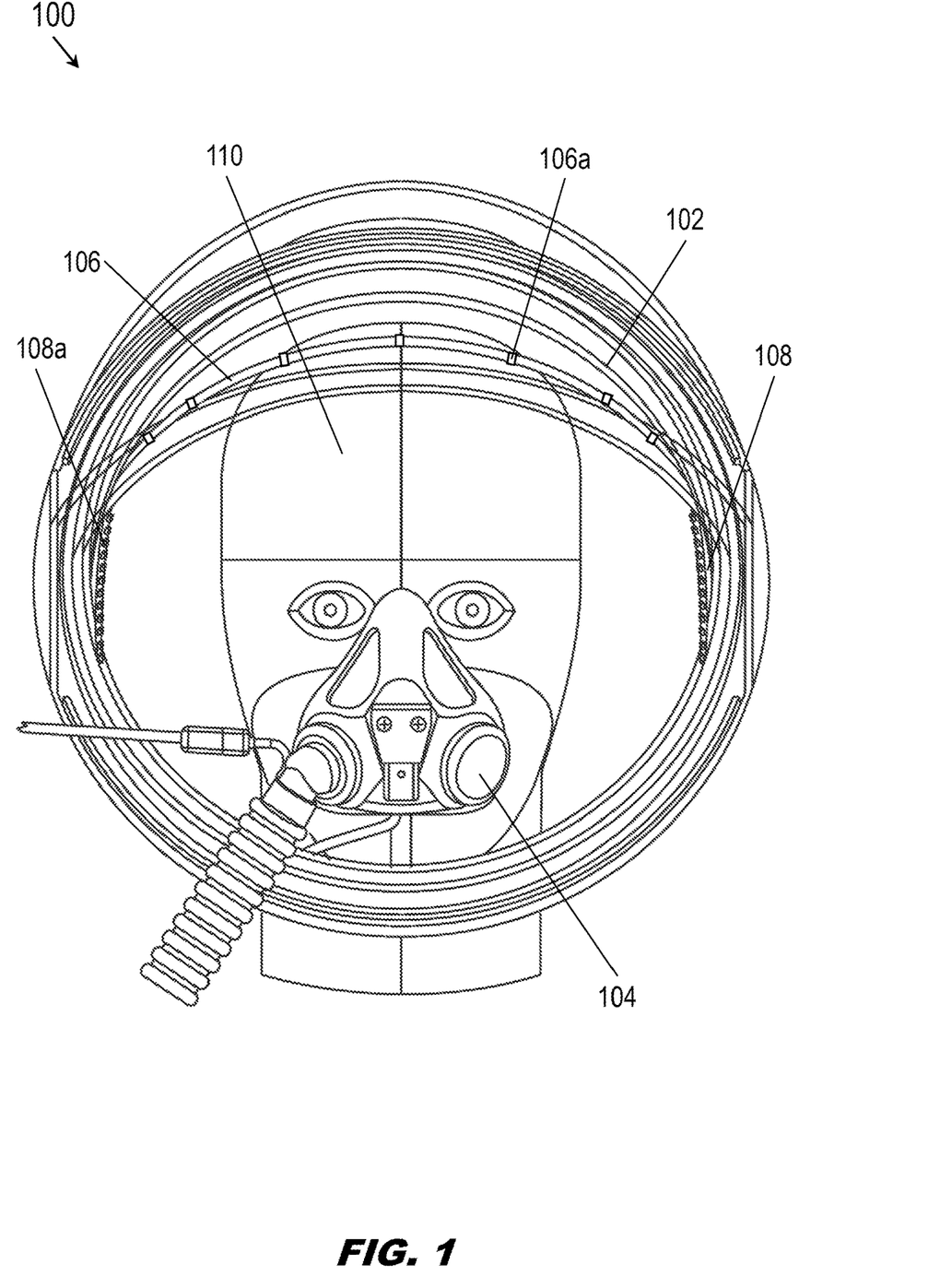
FIG. 1 is a forward view of a helmet assembly for a spacesuit according to example embodiments of this disclosure.

Referring to FIG. 1, a helmet assembly 100 for a spacesuit is disclosed. The helmet assembly 100 may include an external face shield 102, breathing apparatus 104, primary LED array 106, and auxiliary LED arrays 108.

In embodiments, the primary LED array 106 and auxiliary LED arrays 108 may be internally mounted to the external face shield 102 to provide the user 110 (e.g., wearer of the spacesuit or protective suit) with a simplified, non-intrusive means of receiving current mission-critical information. For example, the primary LED array 106 and auxiliary LED arrays 108 may serve as backup systems to more complex user information systems (e.g., video displays, alphanumeric LCDs, enhanced vision, synthetic vision, augmented reality, virtual reality) or as a primary display system requiring minimal operator input and providing basic mission requirements with minimal distraction.

In embodiments, the primary LED array 106 and auxiliary LED arrays 108 may comprise one-dimensional linear arrays of individual LED units 106a, 108a disposed within the field of view of the user 110, but disposed in such a way as not to obstruct the primary field of view through the external face shield 102. For example, the primary LED array 106 may be disposed in the upper forward field of view of the user 110. Similarly, the auxiliary LED arrays 108 may be disposed respectively in the left and right periphery of the user's field of view. Accordingly, the user 110 may have a generally unobstructed forward field of view through the substantially transparent external face shield 102, but be able to easily see and track information displayed by the primary LED array 106 and auxiliary LED arrays 108, as well as any changes or updates thereto.

Figure 2:
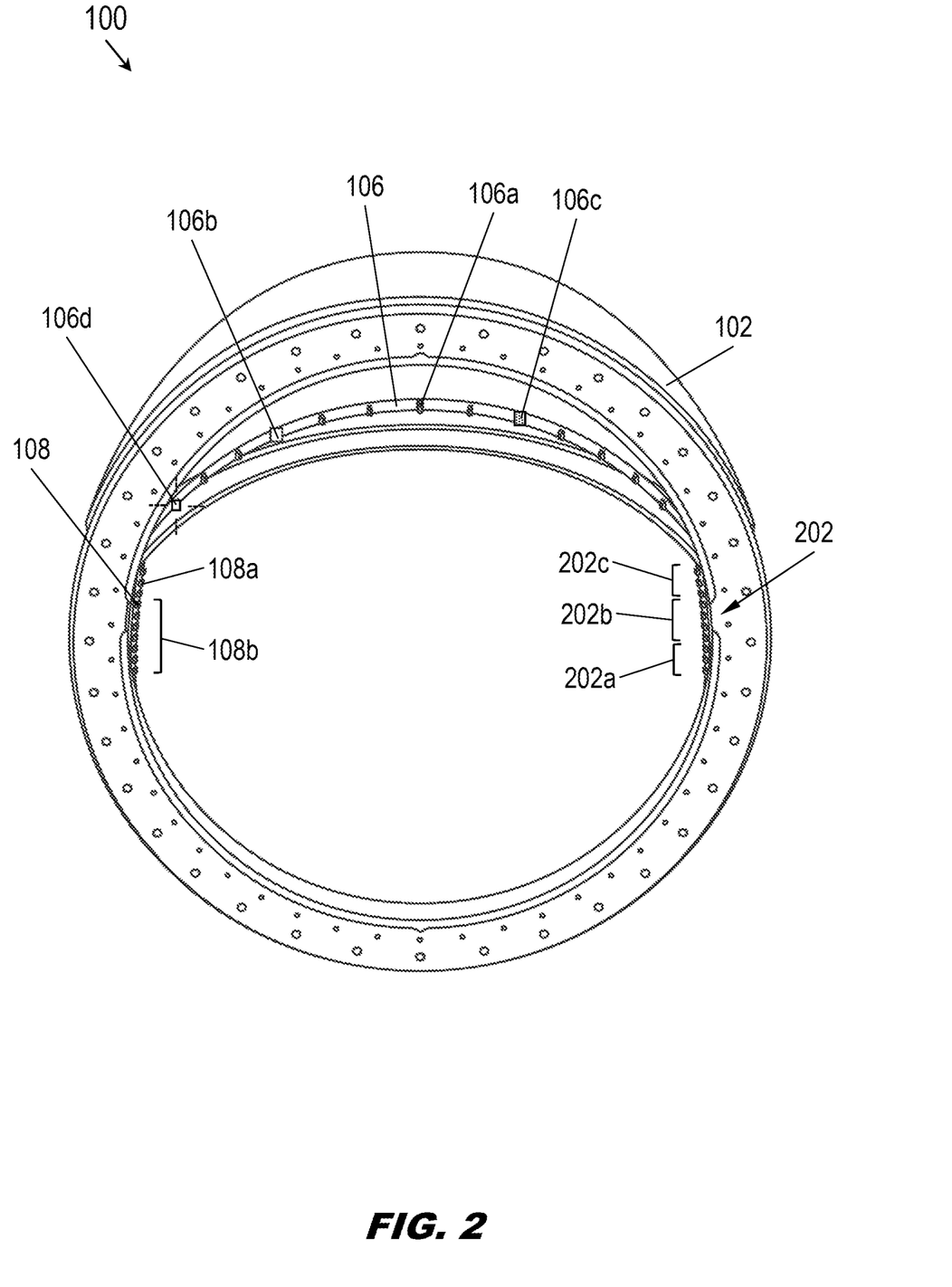
FIG. 2 is a reverse view of the helmet assembly of FIG. 1.

Referring to FIG. 2, the helmet assembly 100 is disclosed.

In embodiments, the primary LED array 106 may incorporate LED units 106a extending across the upper forward field of view of the user (110, FIG. 1) of the helmet assembly 100 in a spaced apart, substantially linear (e.g., one-dimensional) array. For example, the LED units 106a may be evenly or irregularly spaced. In some embodiments, the individual LED units 106a may include transparent LED units, organic LED units (OLED), quantum dots, micro-LED units (pLED), and/or individually addressable LED units.

In embodiments, the primary LED array 106 may be in communication with a positioning or navigational system of the spacesuit and receive positioning information therefrom. For example, the navigational system of the spacesuit may determine a position of the spacesuit, e.g., an absolute satellite-referenced position, a relative position relative to some other known or absolute position (e.g., an absolute position of a lander vehicle serving as a mission waypoint), and/or a pose (incorporating a current position and orientation of the spacesuit, e.g., whether the user 110 of the spacesuit is currently oriented toward or away from the lander vehicle or waypoint).

In embodiments, the primary LED array 106 may illuminate a single LED unit (106b) to indicate to the user 110 a relative position of the lander vehicle or waypoint (e.g., relative to the user). For example, if the lander vehicle or waypoint is directly forward of the user 110 and to the user's left, the LED unit 106b approximately 30 degrees left of forward (e.g., 330 degrees) may be illuminated. In some embodiments, the primary LED array 106 may convey additional positional or navigational information via the adjustment of one or more individual LED units 106a. For example, an individual LED unit may be brightened or dimmed (106c) to indicate a lesser or greater distance between the user 110 and the lander vehicle or waypoint (e.g., which may be indicated by a different color than for a user). In some embodiments, an LED unit (106d) at the left or right terminal end of the primary LED array 106 may flash or strobe to indicate that the lander vehicle or waypoint is no longer within the forward field of view of the user 110 (e.g., the lander vehicle or waypoint is behind the user) or is otherwise out of range (e.g., precise positional information may not be available or may be inferred based on a last known position).

It should be noted that due to the proximity of the primary and auxiliary LED arrays 106, 108 to the user (110, FIG. 1), it may be far more practical to provide information via the primary and auxiliary LED arrays in less distracting and more easily perceptible non-alphanumeric formats. However, depending on the size of primary or auxiliary LED arrays 106, 108, or of their component LED units 106a-d, information conveyed by a discrete LED unit may not be ideally perceptible by the user 110, as it may not be practical or possible for the user to focus on a single individual LED unit. Accordingly, the auxiliary LED arrays 108, 202 may convey statuses, statistics, consumables levels, and other non-alphanumeric information to the user 110 via collective illumination, delumination, or status changes affecting a group of individual LED units 108*a-b*, 202*a-c*. For example, the auxiliary LED array 108 may include a substantially vertical linear or one-dimensional array of individual LED units 108*a* which may progressively illuminate to indicate a suit status or consumables level, e.g., a battery level or power indicator; an oxygen ($O_2$) tank level indicator; a carbon dioxide ($CO_2$) scrubber performance indicator; and/or a suit pressure status.

In embodiments, a linear subset (108*b*) of the individual LED units 108*a* of the auxiliary LED array 108 may illuminate to indicate a relative level or status. For example, if the LED array 108 comprises ten individual LED units 108*a*, seven of which (108*b*) are currently illuminated, this may be interpreted as a consumables level approximately 70 percent full or a performance status 70% of optimal.

In embodiments, the auxiliary LED array 202 may be implemented and may function similarly to the auxiliary LED array 108, except that the auxiliary LED array 202 may comprise a series of individually addressable LED units capable of changing color to indicate the severity of a status. Alternatively, the auxiliary LED array 202 may comprise multiple groups of progressively colored single-color LED units collectively configured to display a suit status or consumable level of increasing or decreasing severity. For example, the auxiliary LED array 202 may comprise a lower group (202*a*) of red LED units, a middle group (202*b*) of yellow LED units, and an upper group (202*c*) of green LED units.

In embodiments, the auxiliary LED array 202 may display fully illuminated groups of red and yellow LED units (202*a*, 202*b*) and a partially illuminated group (202*c*) of green LED units to represent, e.g., an oxygen tank level near full. For example, as the oxygen tank is depleted, the green LED units 202*c* and yellow LED units 202*b* may progressively deluminate to heighten the increasing severity of the tank level. In some embodiments, the red LED units 202*a* may be placed at the top of the auxiliary LED array 202, and the green LED units 202*c* placed at the bottom thereof, such that the individual LED units of the auxiliary LED array may progressively illuminate in green, then yellow, then red to indicate a suit status or consumable level (e.g., a suit pressure level) increasing in severity as the status or level increases.

In some embodiments, the primary LED array 106 and/or auxiliary LED arrays 108, 202 may execute other types of collective or group illumination or delumination operations to convey various types of non-alphanumeric information. For example, one or more (106*a-d*, 108*a-b*) of the component LED units of the primary or auxiliary LED arrays 106, 108, 202 may ramp up or down in brightness. In some embodiments, one or more component LED units 108*a-b* may collectively generate a dot or marker that appears to move vertically or laterally along the LED array (e.g., to convey rate or direction) at a consistent, increasing, or decreasing rate (e.g., to convey acceleration/deceleration, magnitude, or increasing/decreasing proximity).

Figure 3:
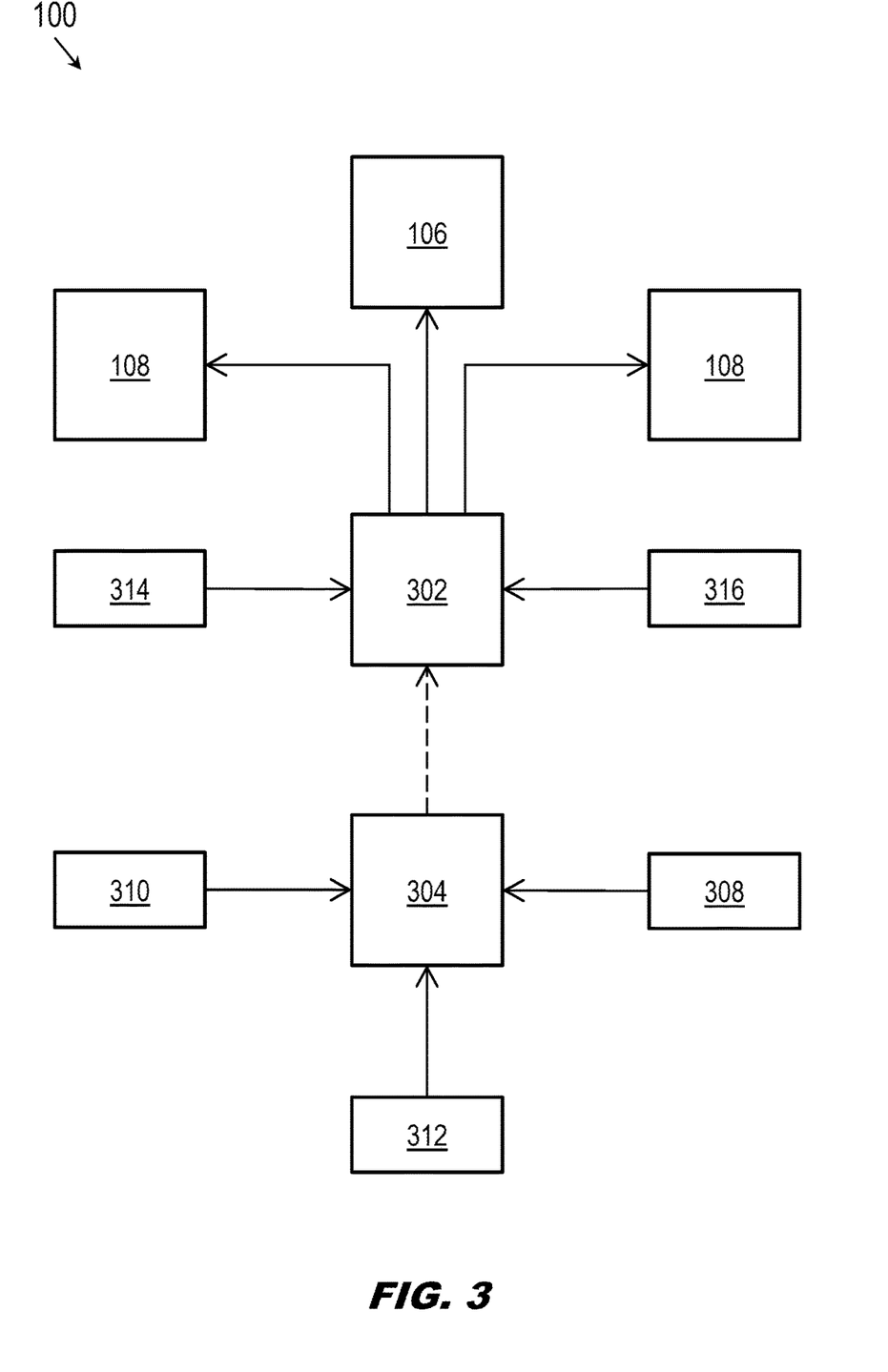
FIG. 3 is a block diagram illustrating components of the helmet assembly of FIG. 1.

Referring to FIG. 3, the helmet assembly 100 is shown.

In embodiments, the information portrayed by the primary LED display 106 and auxiliary LED displays 108 may be managed by a display controller 302 (e.g., display control processors) in communication with a suit controller 304 (e.g., suit control processors) of the spacesuit or protective suit. For example, the suit controller 304 may manage and regulate internal function parameters and consumables levels 306 (e.g., $O_2$ tank levels, $CO_2$ scrubber efficiency, suit pressure levels), communicating these levels to the display controller 302 for display. Similarly, the suit controller 304 may be in communication with a position receiver 308 of the suit and receive therefrom updates to the position (e.g., absolute or relative) and/or orientation of the spacesuit. Additionally, the suit controller 304 may receive external position and status data 312 from, e.g., other proximate spacesuits and/or a base facility or lander vehicle and forward this external data to the display controller 302.

In embodiments, the primary LED array 106 and auxiliary LED arrays 108 may be configured to display more than one dataset. For example, the user (110, FIG. 1) may toggle through multiple displayed datasets via a manual control panel 314 mounted to the suit. In some embodiments, the helmet assembly 100 may include a microphone 316 capable of receiving verbal control input from the user 110. For example, the display controller 302 may be trained to recognize commands to activate or deactivate the primary LED array 106 or auxiliary LED arrays 108, or to shift the displayed dataset to another displayed dataset (e.g., an auxiliary LED array 108 may be configured to display four different datasets A, B, C, D; when manual or verbal control input is received the display controller 302 may toggle through the list of datasets A→B→C→D→A . . . in response to each new command received.

Figure 4A:
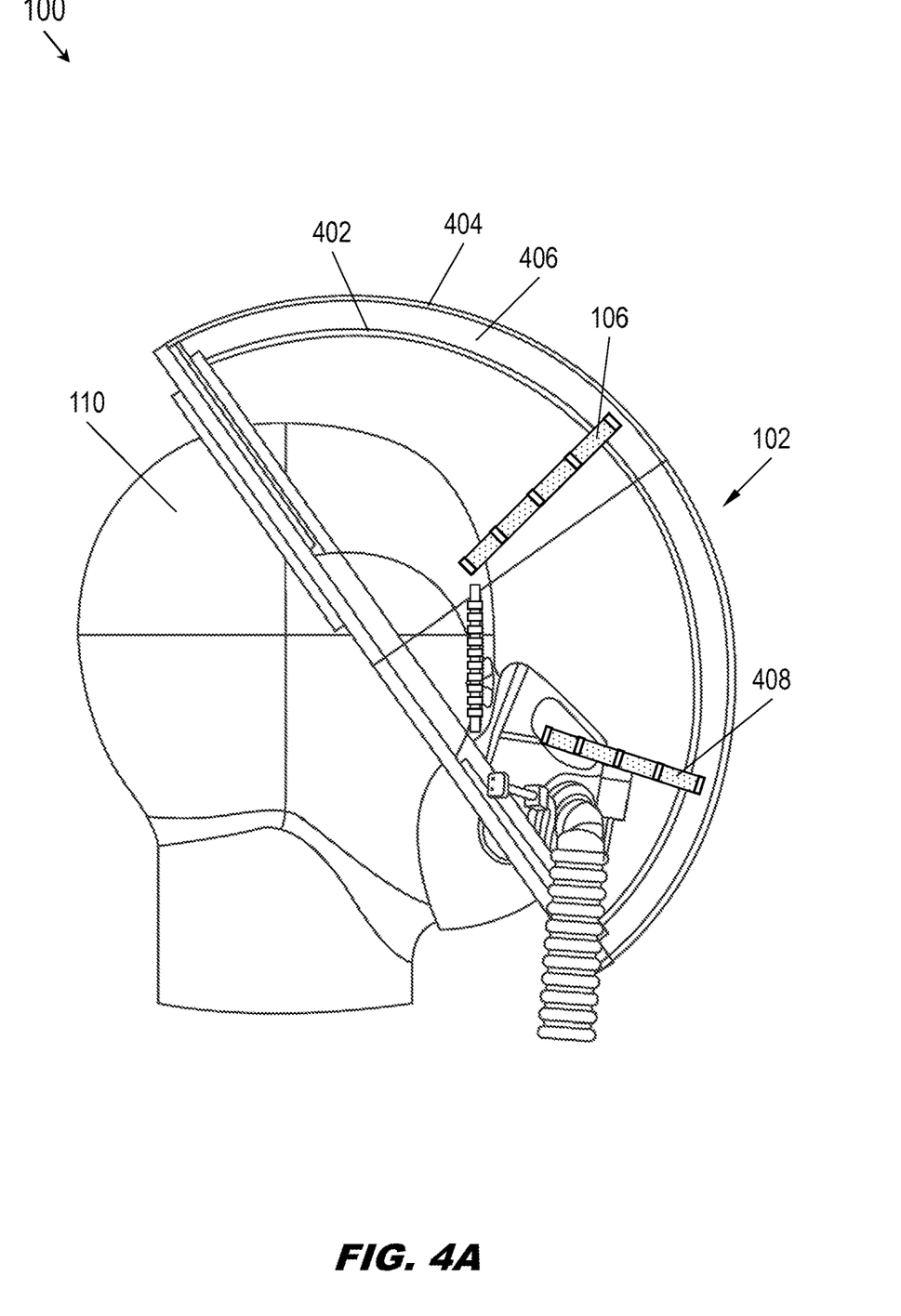
FIG. 4A is a right profile view of the helmet assembly of FIG. 1.

Referring to FIG. 4A, the helmet assembly 100 is disclosed.

In embodiments, the external face shield 102 may include an inner layer 402 or shell and an outer layer 404 of shell, the inner and outer layer separated by a gap 406. For example, the primary LED array 106 and auxiliary LED array 108 may be hard-mounted to the exterior of the inner layer 402, such that the primary and auxiliary LED arrays are disposed within the gap 406. In some embodiments, the helmet assembly 100 may incorporate a primary LED array 408 implemented similarly to the primary LED array 106, but disposed in the lower periphery of the forward field of view of the user 110 (in addition to, or instead of, the primary LED array 106 disposed in the upper periphery of the forward field of view). In some embodiments, the primary and/or auxiliary LED arrays 106, 108 may be hard-mounted to the interior or exterior of the outer layer 404, although the exterior of the outer layer may be a less desirable location due to the risk of exposure. Similarly, the primary and/or auxiliary LED arrays 106, 108 may be hard-mounted to the interior of the inner layer 402, although this too may be a less desirable option due to the full-oxygen environment within the inner layer.

Figure 4B:
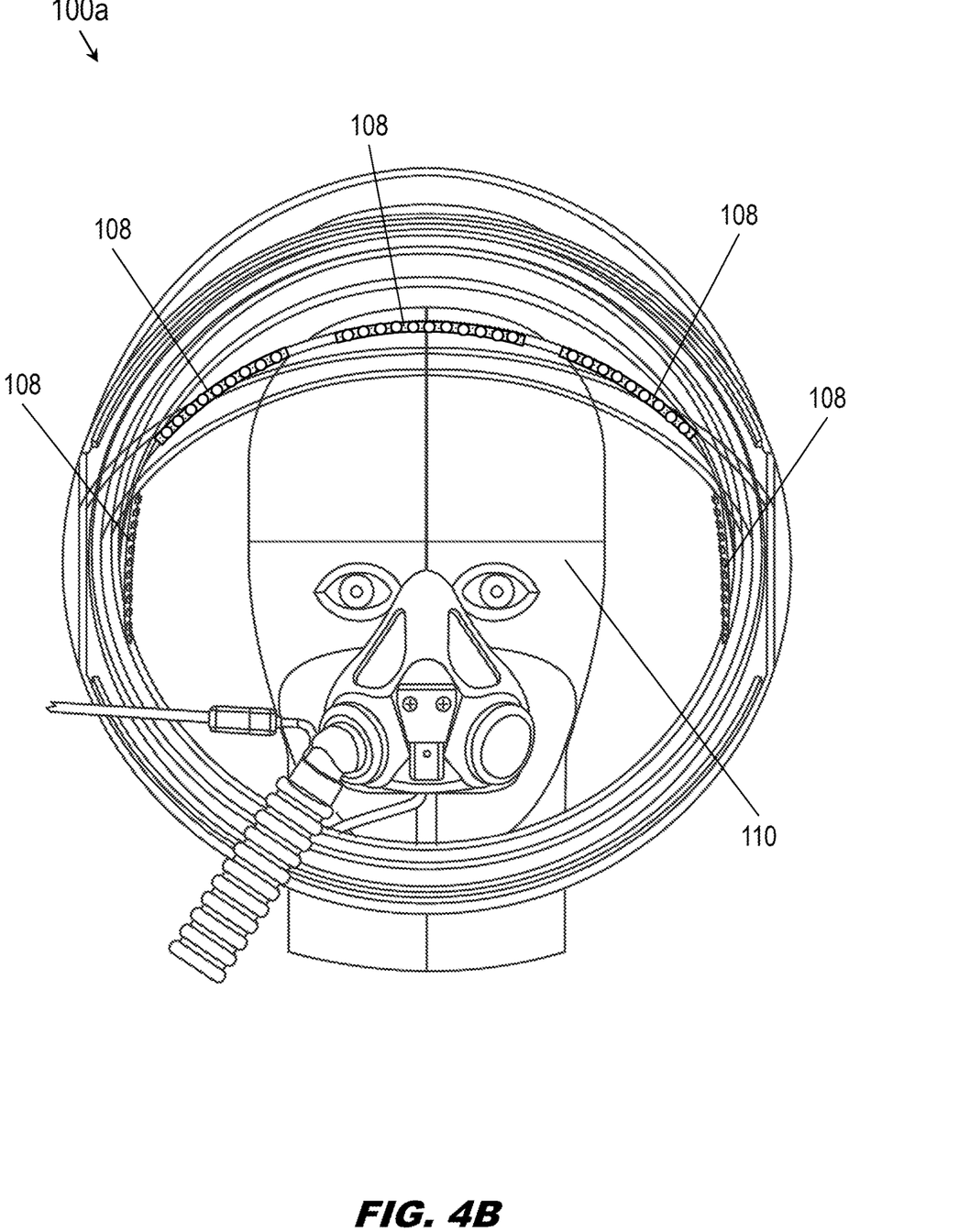
FIG. 4B is a forward view of the helmet assembly of FIG. 1.

Referring to FIG. 4B, the helmet assembly 100*a* may be implemented and may function similarly to the helmet assembly 100 of FIGS. 1 through 4A, except that the helmet assembly 100*a* may incorporate multiple auxiliary LED arrays 108 mounted across the upper or lower periphery of the forward field of view of the user 110.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A helmet assembly for a spacesuit, comprising:
an external face shield attachable to a first spacesuit, the external face shield providing at least one field of view (FOV) to a user of the first spacesuit;
one or more suit status displays mounted to the external face shield within the at least one FOV, each suit status display comprising:
a one-dimensional array of one or more light-emitting diode (LED) units;
and
an LED controller operatively coupled to the array of LED units and in communication with a suit controller and with at least one position sensor of the first spacesuit, the LED controller configured to:
receive at least one suit status from the suit controller, the at least one suit status including:
at least one of a first relative position, a first bearing, or
a first heading associated with a vehicle;
and
at least one of a second relative position, a second bearing, or a second heading associated with a second spacesuit;
and
display the received suit status to the user by illuminating one or more LED units of the array.

2. The helmet assembly of claim 1, wherein the array of LED units is disposed within a forward field of view.

3. The helmet assembly of claim 1, wherein the array of LED units is disposed within a peripheral field of view.

4. The helmet assembly of claim 1, wherein the array of LED units is an array of one or more individually addressable LED units.

5. The helmet assembly of claim 1, wherein the LED controller is configured to display the received suit status by at least one of dimming, flashing, and strobing one or more LED units of the array.

6. The helmet assembly of claim 1, wherein the LED controller is configured to display the received suit status by adjusting a brightness level of one or more LED units of the array.

7. The helmet assembly of claim 1, wherein the LED controller is configured to display the received suit status by changing one or more LED units of the array from a first color to a second color.

8. The helmet assembly of claim 1, wherein the at least one suit status is selected from a group including:
a consumable level associated with the first spacesuit;
and
a component performance status associated with the first spacesuit.

9. The helmet assembly of claim 1, wherein:
the external face shield comprises an at least partially transparent inner layer and an at least partially transparent outer layer separated by a gap layer;
and
the one or more suit status displays are mounted to the inner layer within the gap layer.

10. The helmet assembly of claim 1, wherein the LED controller is configured to:
receive control input from the user;
and
based on the received control input, transition from displaying a first suit status associated with illuminating a first subset of one or more LED units of the array to displaying at least one second suit status associated with illuminating a second subset of one or more LED units of the array.

11. The helmet assembly of claim 10, further comprising:
at least one microphone in communication with the LED controller, the microphone configured to receive verbal control input from the user.

12. The helmet assembly of claim 8, wherein the consumable level includes at least one of:
a power level associated with the first spacesuit;
or
a pressure status associated with the first spacesuit.

13. A helmet assembly for a spacesuit, comprising:
an external face shield attachable to a spacesuit, the external face shield providing at least one field of view (FOV) to a user of the spacesuit;
one or more suit status displays mounted to the external face shield within the at least one FOV, each suit status display comprising:
a one-dimensional array of one or more light-emitting diode (LED) units;
and
an LED controller operatively coupled to the array of LED units and in communication with a suit controller of the spacesuit, the LED controller configured to:
receive at least one first suit status from the suit controller;
and
display the at least one first suit status to the user by illuminating a first subset of one or more LED units of the array;
and
at least one microphone in communication with the LED controller, the microphone configured to receive verbal control input from the user;
wherein the LED controller is configured to, based on the received verbal control input from the user, transition from displaying the at least one first suit status to displaying at least one second suit status by illuminating a second subset of one or more LED units of the array.

14. The helmet assembly of claim 13, wherein the array of LED units is disposed within at least one of a forward field of view or a peripheral field of view.

15. The helmet assembly of claim 1, wherein the array of LED units is an array of one or more individually addressable LED units.

16. The helmet assembly of claim 13, wherein the LED controller is configured to display the first suit status or the second suit status via at least one of:
flashing or strobing one or more LED units of the array;
adjusting a brightness level of one or more LED units of the array;

or
changing one or more LED units of the array from a first color to a second color.

17. The helmet assembly of claim 13, wherein the at least one first suit status is selected from a group including:
a consumable level associated with the spacesuit; or
a component performance status associated with the spacesuit.

18. The helmet assembly of claim 17, wherein the wherein the consumable level includes at least one of:
a power level associated with the first spacesuit; or
a pressure status associated with the first spacesuit.

19. The helmet assembly of claim 13, wherein the spacesuit is a first spacesuit, the LED controller is communicatively coupled with a position sensor of the spacesuit, and the at least one first suit status is selected from a group including:
at least one of a first relative position, a first bearing, and a first heading associated with a vehicle; and
at least one of a second relative position, a second bearing, and a second heading associated with a second spacesuit.

20. The helmet assembly of claim 13, wherein:
the external face shield comprises an at least partially transparent inner layer and an at least partially transparent outer layer separated by a gap layer; and
the one or more suit status displays are mounted to the inner layer within the gap layer.

* * * * *